United States Patent [19]
Giachinta et al.

[11] Patent Number: 5,967,721
[45] Date of Patent: Oct. 19, 1999

[54] LOOSENING-RESISTANT THREADED FASTENER SYSTEM AND METHOD OF USE

[75] Inventors: Anthony Giachinta, Revere, Mass.; Eugene W. Thomas, Nashua, N.H.

[73] Assignee: Allen-Bradley Company, LLC, Milwaukee, Wis.

[21] Appl. No.: 09/156,347

[22] Filed: Sep. 18, 1998

[51] Int. Cl.[6] .............................. F16B 3/100; F16B 33/04
[52] U.S. Cl. .............................. 411/7; 411/14; 411/120; 411/204
[58] Field of Search .............................. 411/6, 7, 9, 10, 411/14, 120, 121, 136, 149, 150, 204

[56] References Cited

U.S. PATENT DOCUMENTS

| | | | |
|---|---|---|---|
| 3,273,443 | 9/1966 | Rubin | 411/7 |
| 3,425,314 | 2/1969 | Ohlson | 411/7 |
| 4,434,736 | 3/1984 | Szostak et al. | 411/7 X |
| 5,533,849 | 7/1996 | Burdick | 411/120 |
| 5,606,753 | 3/1997 | Hashimoto | 411/120 X |

*Primary Examiner*—Neill Wilson
*Attorney, Agent, or Firm*—Robert A. Van Someren; John M. Miller; John J. Horn

[57] ABSTRACT

A loosening-resistant threaded fastener system and method of use includes a washer that is axially movable on a threaded stud, a threaded nut having threads which cooperate with the threaded stud, and a washer anti-rotation mechanism to prevent the washer from rotating on the stud about a fastening axis. One of the washer and the nut may include a plurality of protrusions while the other of the washer and the nut has a plurality of detents. The protrusions and the detents engage one another at a plurality of angular positions. Rotating the nut on the stud while in contact with the washer results in distinct, audible clicks which may be counted to obtain a pre-determined tightness.

25 Claims, 3 Drawing Sheets

LOOSENING-RESISTANT THREADED FASTENER SYSTEM AND METHOD OF USE

TECHNICAL FIELD

The present invention relates to threaded fastening of components and structures, particularly for such components and structures that are subject to vibrations or other stresses.

BACKGROUND ART

The fastening of components and structures using cooperating threaded techniques is a standard methodology. Innovation in the art of threaded fastening continues as an active area. Conditions of high vibration, temperature cycling, cold flow, and creep are just a few environments which continually test the state-of-the art.

As plastic material is continually substituted into various applications because of desired weight reduction and other economic factors, improved methods of assuring secure fastening of plastic components without increased risk of breakage are sought. Plastics are notorious for premature failure due to overstress and long term stress cycling. This is particularly apparent with threaded plastics.

SUMMARY OF THE INVENTION

Embodiments of the present invention provide a loosening-resistant threaded fastener system. Other embodiments provide methods of using such a fastener system.

Accordingly, in a first embodiment of the invention, there is provided a threaded fastener system including a washer that is axially movable on a threaded stud, a threaded nut having threads which cooperate with the threaded stud, and a washer anti-rotation mechanism to prevent the washer from rotating on the stud about a fastening axis. This embodiment further provides that one of the washer and the nut has a plurality of protrusions and the other of the washer and the nut has a plurality of detents, the protrusions and the detents being angularly spaced around the fastening axis and oriented so that the protrusions and the detents engage one another at a plurality of angular positions. The washer anti-rotation mechanism may include at least one contour along an inner edge of the washer and at least one corresponding contour displacing the threads about the stud. The washer is axially movable on the threaded stud with the contour angularly aligned with the corresponding contour on the stud. The number of detents may be approximately double the number of protrusions. The detents may be periodic gaps between angularly spaced ridges disposed upon the other of the washer and the nut. The protrusions may be of a symmetric shape measured along the fastening axis and may be supported more flexibly parallel to the fastening axis than orthogonal to the axis. In a specific embodiment, the protrusions and detents are arranged so that the engaging of protrusions and detents upon rotating the nut on the stud while in contact with the washer results in distinct, audible clicks.

In accordance with another embodiment of the invention, a threaded fastener system includes a washer having a ring face orthogonal to a fastening axis and having periodic, angularly spaced fins extending radially outward and orthogonal to the axis. In addition, each fin has a fin face orthogonal to the axis. The system further includes a threaded nut having a mating face and threads that cooperate with a threaded stud and a washer anti-rotation mechanism to prevent the washer from rotating relative to the stud. In this embodiment, one of the spaced fins and the mating face having protrusions, the other of the spaced fins and the mating face having detents with each fin being supported more flexibly parallel to the axis than is the nut. The fins may be more compliant parallel to the fastening axis than orthogonal to the axis and, in another embodiment, are not constrained from flexing parallel to the axis. The engaging of protrusions and detents may result in distinct, audible clicks.

A further embodiment provides a method for threaded fastening to a predetermined tightness including the steps of sliding a washer axially along a threaded stud, rotating a threaded nut on the threaded stud until the nut is finger tight against the washer, and thereafter counting a pre-determined number of distinct audible clicks generated by the nut and washer as the nut is further rotated on the threaded stud until the predetermined number of clicks has been counted. The method may also include preventing the washer from rotating on the threaded stud.

DETAILED DESCRIPTION OF THE INVENTION

Figure 1:
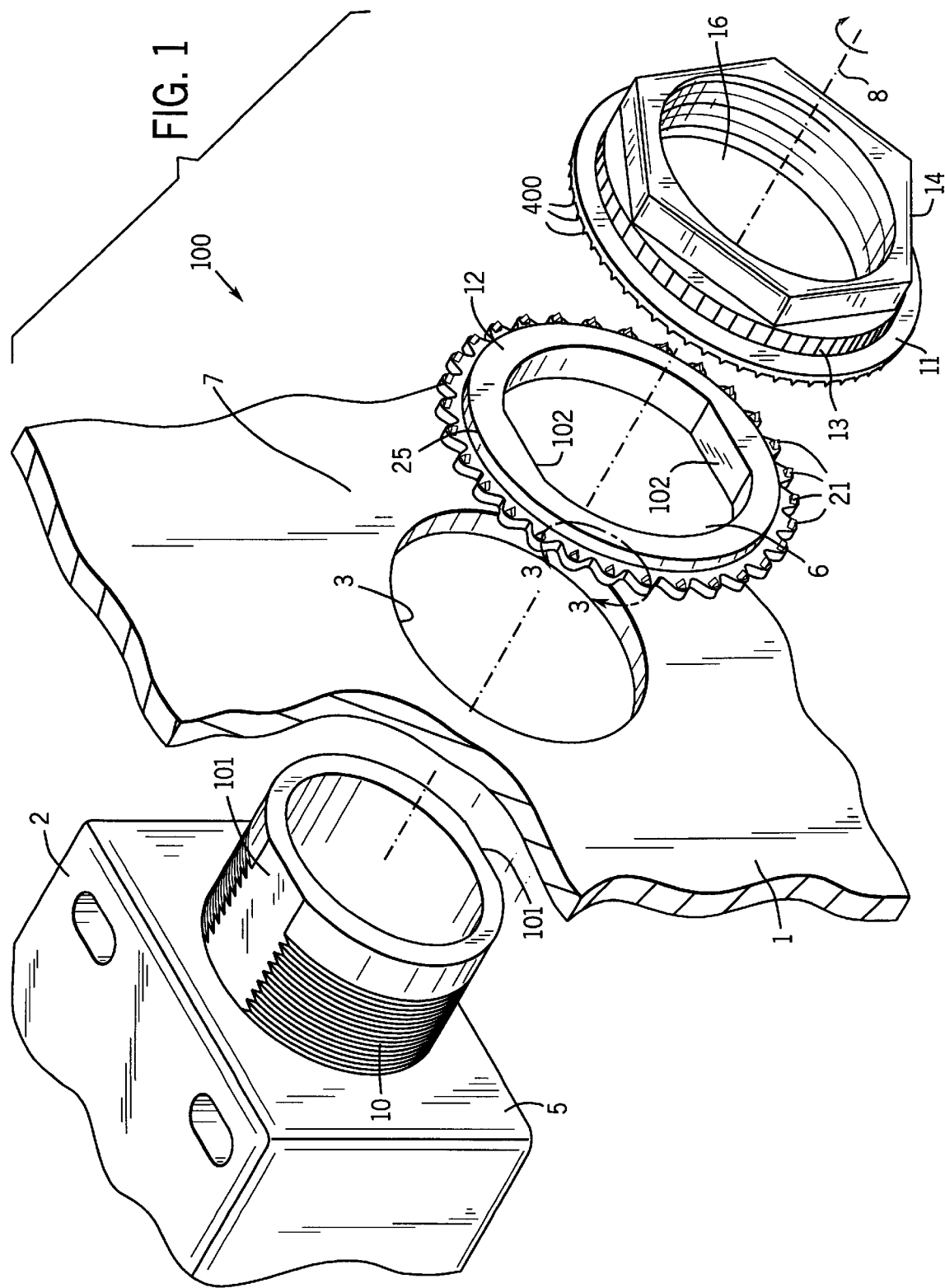
FIG. 1 is an exploded view of a loosening-resistant threaded fastener system according to a embodiment of the invention.

FIG. 1 is an exploded view of a loosening-resistant threaded fastener system 100 according to an embodiment of the invention. In this view, the part to be fastened is depicted as a generic box-shaped component 2. The component 2 is shown as intended for securing to a generic surface 1, which may be, for example, a furnace wall, a machine housing, a bracket, or any other structure for accepting a threaded stud. A male threaded stud 10 is secured to the component. The surface 1 has an opening 3 for receiving the stud 10. The opening 3 may be sized to inhibit lateral mobility of the stud 10 when it is within the opening 3. A washer 12 has an inner diameter 6 sufficient to slide over the stud 10. For fastening, the washer 12 is slid onto the threaded stud 10 until it abuts a near side 7 of the surface 1. The fastening system 100 provides an anti-rotation mechanism to prevent the washer 12 from rotating relative to the threaded stud 10. In this embodiment, a washer anti-rotation mechanism is effectuated by a flat contour 102 along the inner diameter 6 of the washer 12 and a corresponding contour 101 displacing the threads about the stud 10. The washer 12 cannot slide over the stud 10 unless the contour 102 is first aligned with the corresponding contour 101. The washer 12 is prevented from rotating about a fastening axis 8 relative to the stud 10. In a presently preferred embodiment, each of the stud 10 and the washer 12 has two flats, 101 and 102, respectively, disposed opposite and parallel to one another. Other washer anti-rotation mechanisms include, but are not limited to, abutting contours of various curvature and shape, splines, pins and sockets, and other keying arrangements known in this art.

Figure 2:
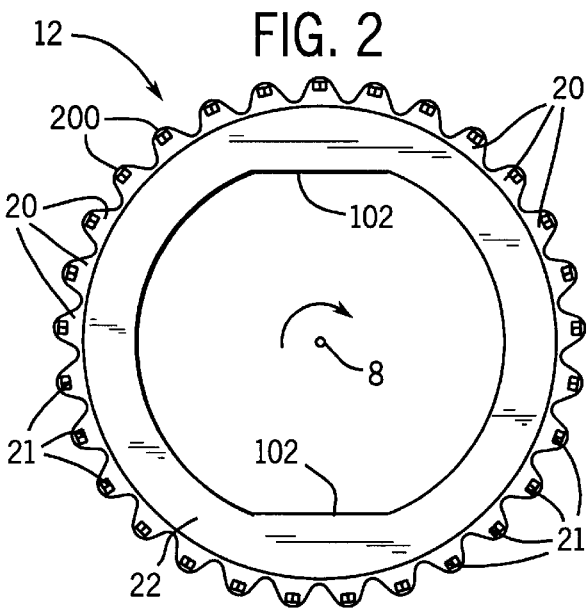
FIG. 2 is a plan view of the washer element of the loosening-resistant threaded fastener system of FIG. 1.
Figure 3:
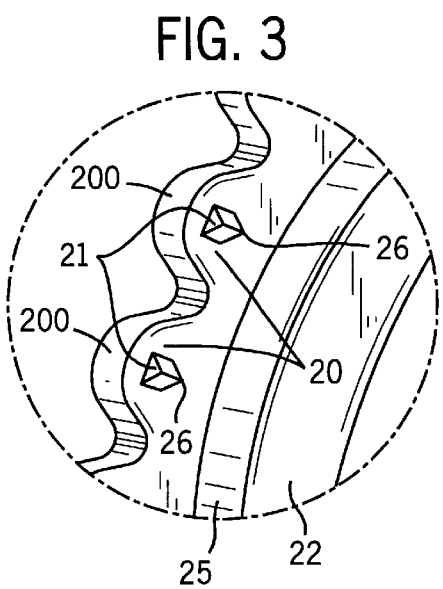
FIG. 3 is a magnified view of a portion of the washer element of FIG. 2.
Figure 6:
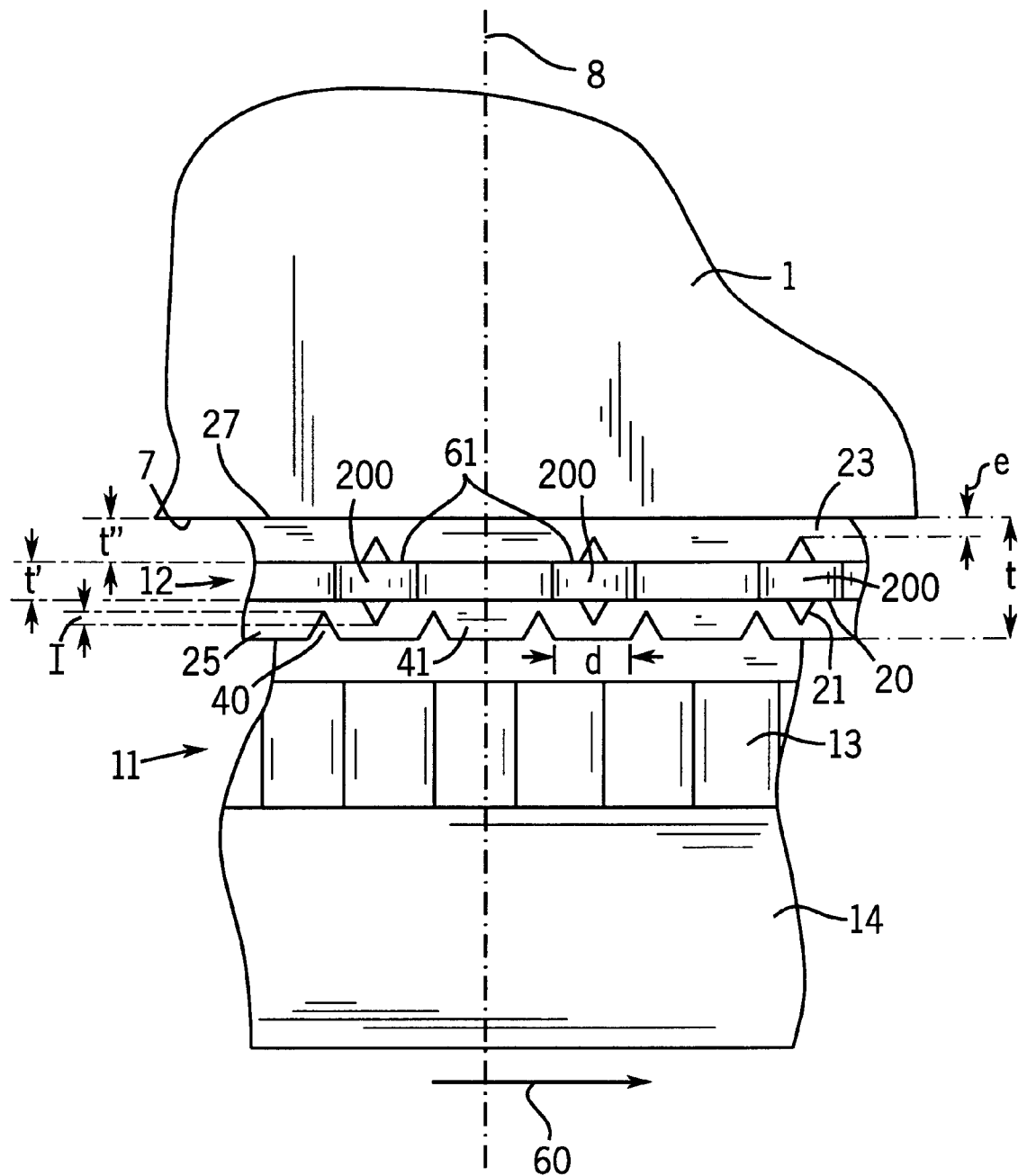
FIG. 6 is a partial top view of the assembled loosening-resistant threaded fastener system FIG. 1.

A nut 11 has a threaded diameter 16 that fits onto the threads of the stud 10. The nut 11 cooperates with the stud 10 and the washer 12 to effectuate fastening. In accordance with an embodiment of the invention, the nut 11 includes a mating surface 400 for making loosening-resistant engagement with the washer 12. The nut 11 and the washer 12 each have either of a plurality of protrusions or a plurality of detents. The protrusions are forced into the detents upon tightening the nut 11 onto the threaded stud 10 thereby resisting loosening that may otherwise be caused by vibrations, thermal changes or other environmental effects. In accordance with a further embodiment, the mating surface 400 interacts with the washer 12 upon tightening to generate a noise, such as a click, at periodic angular intervals. The noises or clicks may thus be used to indicate the amount of rotation that has been applied to the nut 11. When used relative to a standard such as finger tight, the noises or clicks can permit repeatable tightening to a desired torque. In accordance with the embodiment shown, the nut 11 includes a graspable circumferential surface 13 to facilitate hand rotating and tightening or loosening of the nut 11 and further includes a socket head 14 to facilitate rotating the nut 11 with a wrench or other tool. Referring now to FIG. 2, the washer 12 has a ring face 22 oriented essentially orthogonal to the fastening axis 8. In this embodiment, protrusions 21 are located on the washer 12. The protrusions 21 are located on a surface of the washer 12 that is receded from the ring face 22. In the embodiment, the protrusions do not extend out beyond the ring face 22. The protrusions are supported on periodic, angularly spaced fins 200 that extend radially outward orthogonal to the axis 8. Each fin 200 has a fin face 20 on a mating side of the washer 12 with each fin face 20 having disposed upon it a protrusion 21 oriented to engage with detents on the nut 11. As shown in FIG. 3, the fins 200, in this embodiment, are smaller in thickness than is the washer 12. A shoulder 25 spans a distance along the axis 8 between the ring face 22 and each fin face 20. Advantageously, on an opposite side to the mating side of the washer 12, a shoulder 23, as seen in FIG. 6, spans a distance t" along the axis 8 between an abutting face 27 of the washer 12 and the near side 7 of the generic surface 1. The thickness of the fins 200 and the shoulder 23 makes the fins 200 more compliant parallel to the axis 8 than is the nut 11. This shoulder 23 separates the fins 200 supporting the protrusions from butting against the surface 1 to which the system 100 is being attached. The fins 200 are thus free to bend axially. This permits further tightening of the nut 11 onto the stud 10 during which the protrusions 21 are pushed in the direction of the surface 1 by ridges 40 on the nut 11 as engagement between the washer 12 and nut 11 moves from one detent 41 to the next.

The protrusions 21 are preferably beveled to permit the ridges 40 on the nut 11 to ride over them. The protrusions 21 in the illustrated embodiment are beveled on both their clockwise edge and their counter-clockwise edge. Such symmetry will allow a user to tighten or loosen a nut 11 with a sufficient amount of torque. In the embodiment shown, each protrusion 21 has a vertex 26 pointed away from the generic surface 1. To the extent that protrusions 21 are used in an embodiment of the invention, they may be of any of a number of shapes that protrude from the washer 12 toward the nut 11.

Figure 4:
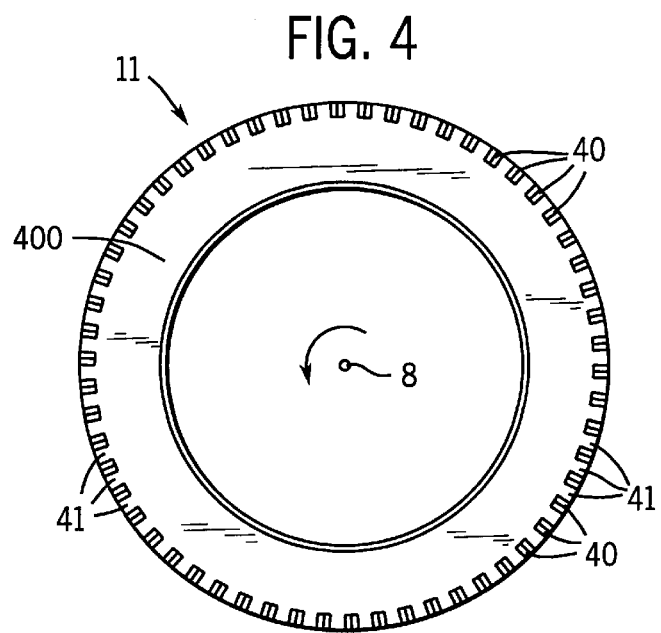
FIG. 4 is a plan view of the back face of the nut element of the loosening-resistant threaded fastener system of FIG. 1.
Figure 5:
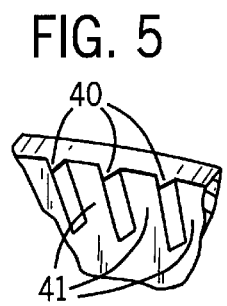
FIG. 5 is a magnified view of a portion of the nut element of FIG. 4.

Referring now to FIG. 4, the mating surface 400 of the nut 11 is oriented essentially orthogonal to the fastening axis 8. In this embodiment, periodic, angularly spaced ridges 40 are disposed about the outer edge of the surface 400. Each ridge is separated from adjacent ridges 40 by a predetermined angle of rotation. Detents 41 are periodic gaps between the ridges 40. FIG. 5 is a magnified view of the shape and orientation of the ridges 40 in accordance with a specific embodiment of the invention. The detents 41 are of size and shape so as to engage the protrusions 21 and keep the nut 11 in a specific angular position relative to the washer 12 (which may not rotate) without a user's application of additional torque to the nut 11. The resistance to loosening will depend on the number of protrusions 21 and detents 41 that engage, the depth to which they engage (commonly referred to as the interference I) and the bevels of the contact regions between each protrusion 21 and detent 41. These factors can be designed into a fastening system 100 to get a desired resistance to loosening.

In FIG. 6, the arrow 60 denotes a tightening (clockwise) direction. In this embodiment, protrusions are included on both the fin face 20 and on an opposing fin face 61. This added symmetry allows this washer 12 to be used with either face mating against the nut 11. This may provide economic advantage as well as practical convenience. The inclusion of protrusions on opposing fin face 61 diminishes an effective distance, e (now equal to t" less the height of an included protrusion on opposing fin face 61), along the axis 8 between the abutting face 27 of the washer 12 and the near side 7 of the generic surface 1. As long as the effective distance e exceeds the interference I, a user's application of additional torque to the nut 11 will allow tightening or loosening. Additionally, there are twice as many detents 41 as there are protrusions 21. The number of detents 41 determines the number of specific angular positions at which the nut 11 may be locked. Also determined is the number of clicks per turn that are heard when tightening the nut 11 against the nonrotatable washer 12. Audible clicking sounds will be generated each time a protrusion 21 rubs along a ridge 40 and moves from one detent 41 to the next detent 41. The size d of the detents 41 determines the possible range of motion of the nut 11 while locked at a given angular position. The fin thickness t' is shown to be less than washer thickness t. The shoulder 23 allows each fin 200 to bend away from the nut 11 as the ridges 40 on the nut 11 pass over the protrusions 21 while rotating the nut 11.

In accordance with an embodiment of the invention, the production of audible clicks during the tightening operation incorporates a built-in indicator of fastener tightness. A method for threaded fastening to a pre-determined tightness includes sliding a washer 12 parallel to a fastening axis 8 along a threaded stud 10, rotating a threaded nut 11 on the threaded stud 10 until the nut 11 is finger tight against the washer 12, and thereafter, counting a pre-determined number of distinct audible clicks generated by the nut 11 and washer 12 as the nut 11 is further rotated on the threaded stud 10 until the pre-determined number of clicks has been counted. In a further embodiment, the washer 12 is prevented from rotating on the threaded stud 10. The counting of a predetermined number of clicks may be helpful in avoiding overtorquing the fastening system 100 which could cause elements of the plastic fastening system to crack. A measure of adequacy of fastener strength or tightness without additional hardware or tools may be achieved. In addition, improved quality control may occur by reproducibly tightening for a specific number of clicks avoiding undertightening of such parts, particularly if they are subject to vibration or other stress. As disclosed above, the number or periodicity of detents 41 tracks with the accuracy of the indicator, in accordance with an embodiment of the invention.

A fastener system 100, as described above, can be made from any of a variety of materials including metals and plastics. The fastener system 100, in accordance with an embodiment of the invention, has been successfully manufactured using resin material. In particular, polyester material based on polybutylene terephthalate (PBT), marketed, for example, by General Electric, Plastics Division as Valox, is contemplated as an appropriate choice for injection molded parts. A presently, preferred embodiment (see FIG. 6) includes a washer 12 of approximately 30 mm nominal inner diameter, about 2.3 mm washer thickness t, having a shoulder 23 (of thickness t" of about 0.9 mm) allowing each fin 200 to bend away from the nut 11. The washer 12 has 30 fins 200, each having thickness t' of about 0.5 mm which are angularly spaced at 12 degrees from each other, with each fin 200 having a pyramidal-shaped protrusion 21 extending about 0.5 mm axially from each fin face 20. It further includes a nut 11 with threads and inner diameter to cooperate with a 30 mm stud, and 60 detents 41 (of spacing d of about 3.5 mm) formed from ridges 40, of an axial extent of about 0.7 mm, with the protrusions 21. The interference, I, is, therefore, no greater than about 0.2 mm (ridge extent minus protrusion extent) The effective distance e (t" less added protrusion extent of about 0.5 mm) of about 0.4 mm is larger than the value of I, facilitating loosening and tightening. Two diametrically opposing flat contours 102 are provided in the washer 12 as are two diametrically opposing flat mating contours 101 in the stud 10.

Although the invention has been described with reference to preferred embodiments, it will be understood by one of ordinary skill in the art that various modifications can be made without departing from the spirit and the scope of the invention, as set forth in the claims hereinbelow.

What is claimed is:

1. A threaded fastener system for holding an object comprising:
   a washer axially movable on a threaded stud, the washer including at least one ring face disposed to contact the object when moved a sufficient distance along the threaded stud;
   a threaded nut having threads which cooperate with the threaded stud;
   a washer anti-rotation mechanism to prevent the washer from rotating on the stud about a fastening axis; and
   wherein one of the washer and the nut has a plurality of protrusions and the other of the washer and the nut has a plurality of detents, the protrusions and the detents being angularly spaced around the fastening axis and oriented so that the protrusions and the detents engage one another at a plurality of angular positions, further wherein the plurality of protrusions or detents included on the washer are disposed on a surface receded from the at least one ring face.

2. A system according to claim 1, wherein the washer anti-rotation mechanism comprises at least one contour along an inner edge of the washer and at least one corresponding contour displacing the threads about the stud and wherein the washer is axially movable on the threaded stud with the contour angularly aligned with the corresponding contour but rotation is prevented by abutment between the at least one contour and the at least one corresponding contour.

3. A system according to claim 2, wherein the contour and the corresponding contour are flat.

4. A system according to claim 1, wherein the nut is made of plastic.

5. A system according to claim 1, wherein the number of detents is approximately double the number of protrusions.

6. A system according to claim 1, wherein the detents are periodic gaps between angularly spaced ridges disposed upon the other of the washer and the nut.

7. A system according to claim 6, wherein the number of detents is approximately double the number of protrusions and wherein the nut is made of plastic.

8. The system according to claim 1, wherein the washer includes the plurality of protrusions mounted on flexible radially extending fins.

9. A system according to claim 1, wherein the protrusions are of a symmetric shape measured along the fastening axis.

10. A system according to claim 1, wherein the protrusions are supported more flexibly parallel to the fastening axis than orthogonal to the axis.

11. A system according to claim 10, wherein the protrusions and detents are arranged so that the engaging of protrusions and Detents upon rotating the nut on the stud while in contact with the washer results in distinct, audible clicks.

12. A threaded fastener system comprising:
   a washer having a ring face orthogonal to a fastening axis and having periodic, angularly spaced fins extending radially outward and orthogonal to the axis, each fin having a fin face orthogonal to the axis;
   a threaded nut having a mating face and threads that cooperate with a threaded stud; and
   a washer anti-rotation mechanism to prevent the washer from rotating relative to the stud, with one of the spaced fins and the mating face having protrusions, the other of the spaced fins and the mating face having detents, each fin is supported more flexibly parallel to the axis than is the nut.

13. A system according to claim 12, wherein the washer anti-rotation mechanism comprises at least one contour along an inner edge of the washer and at least one corresponding contour displacing the threads about the stud and wherein the washer is axially movable on the threaded stud with the contour angularly aligned with the corresponding contour but rotation is prevented by abutment between the at least one contour and the at least one corresponding contour.

14. A system according to claim 13, wherein the contour and the corresponding contour are flat.

15. A system according to claim 12, wherein the nut is made of plastic.

16. A system according to claim 12, wherein the number of detents is approximately double the number of protrusions.

17. A system according to claim 12, wherein the detents are periodic gaps between angularly spaced ridges disposed upon the other of the ring surface and the mating surface.

18. A system according to claim 12, wherein the protrusions are of a symmetric shape measured along the fastening axis.

19. A system according to claim 12, wherein the fins are more compliant parallel to the fastening axis than orthogonal to the axis.

20. A system according to claim 12, wherein the fins are not constrained from flexing parallel to the axis.

21. A system according to claim 19, wherein the engaging of protrusions and detents results in distinct, audible clicks.

22. A system according to claim 20, wherein the engaging of protrusions and detents results in distinct, audible clicks.

23. A system according to claim 17, wherein the number of detents is approximately double the number of protrusions and wherein the nut is made of plastic.

24. A method for threaded fastening to a pre-determined tightness comprising:

sliding a washer axially along a threaded stud, rotating a threaded nut on the threaded stud until the nut is finger tight against the washer, generating distinct audible clicks by moving protrusions disposed on the threaded nut through flexible interfering fins extending radially outward from the washer, and thereafter counting a pre-determined number of the distinct audible clicks generated by the nut and washer as the nut is further rotated on the threaded stud until the predetermined number of clicks has been counted.

25. The method of claim 24 further comprising:

preventing the washer from rotating on the threaded stud.

* * * * *